INVENTOR.
Francis J. Shonebarger
BY
ATTORNEYS

United States Patent Office 3,502,454
Patented Mar. 24, 1970

3,502,454
STRENGTHENING AND COLORING OF ARTICLES MADE OF REDUCED SODA-LIME GLASS COMPOSITIONS
Francis J. Shonebarger, Lancaster, Ohio, assignor to Anchor Hocking Glass Corporation, Lancaster, Ohio, a corporation of Delaware
Continuation-in-part of application Ser. No. 540,080, Apr. 4, 1966. This application Mar. 28, 1967, Ser. No. 626,504
Int. Cl. C03c 17/08
U.S. Cl. 65—30                    12 Claims

ABSTRACT OF THE DISCLOSURE

A method of altering the spectral transmission of amber colored soda-lime glass articles by changing their surface coloration while simultaneously increasing their strength. The article is made of a reduced glass composition and is heated to a temperature which is above the annealing point of the glass composition but below the temperature at which the article will deform. While heating, the article is exposed to the vapor of a cuprous halogen, with no contact being made between the article and the cuprous halogen in non-vaporous form. The heating and exposing continues until a copper ion-enriched surface zone is formed on the article. Then, the article is cooled below the annealing point in a non-reducing atmosphere, after terminating the exposure to the cuprous halogen vapor.

---

Figure 1:
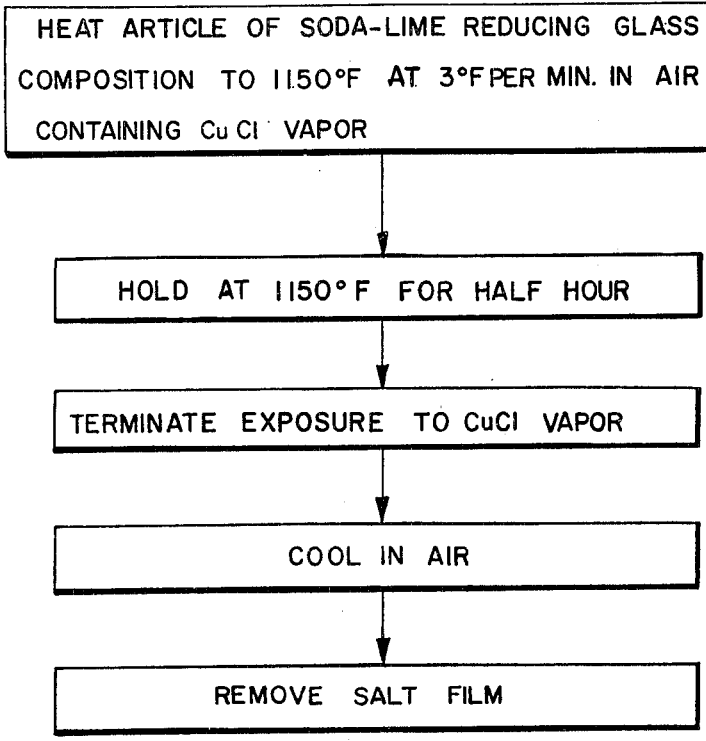

This application is a continuation-in-part of my copending application Ser. No. 540,080, filed Apr. 4, 1966, now abandoned.

The invention relates both to the method of treating articles of reduced glass compositions with cuprous chloride and other cuprous halogens, and to articles strengthened by the new method.

In my copending application above identified, there is disclosed a method for strengthening articles made of oxidized glass compositions. The resulting articles are essentially unchanged in color as a result of the strengthening treatment; that is, articles which are colorless before the treatment are essentially clear after it, at least as viewed in the direction perpendicular to the treated surface. Similarly, colored glass articles are essentially unchanged in color by the treatment.

The present invention relates to a method of treating articles made of reduced, or reducing, glasses as distinguished from the oxidized glasses to which Serial No. 540,080 relates. This method further differs from that disclosed in my copending application in that the treatment can be used to markedly change the color of the glass articles, often producing a red or ruby color, as an incident to the strengthening process.

The tensile strength of perfect glass is very high if the surface of the glass is completely unabraded. The slightest scratch reduces the tensile strength to a fraction of the unabraded strength, and as a practical matter it may be said that completely unabraded glass articles do not generally exist outside of the laboratory. Inevitably, a glass article is sufficiently scratched by the ordinary handling incidental to manufacture, packaging and use that for all practical purposes it must be considered as abraded and, hence, as having a tensile strength of low order in comparison with unabraded glass of the same composition.

It is known that glass can be strengthened and made more resistant to the effects of abrasion by imparting a compressional surface stress to it. Such strengthening can be accomplished by tempering, that is, by heating the glass article and then suddenly cooling it. However, the increase in strength obtained by the tempering method is usually not permanent, and may be lost if the article is heated in use for too long a period at temperatures near its strain point. Moreover, the maximum tensile strength which can be obtained in many types of glass articles by tempering is relatively low in comparison to the strengths which can be achieved by the present invention.

Another method of strengthening glass, described in Hood et al. Patent No. 2,779,136, is carried out by contacting glass articles of certain compositions with a molten lithium salt. Inasmuch as that method requires that the article be immersed in a liquid treating bath at high temperature, it is relatively cumbersome in comparison to the present process, which provides a vapor phase treatment.

I have discovered a method of encasing a glass article with a compressional surface layer or zone whereby these shortcomings of prior art methods are obviated, and by which glass articles can be produced having tensile strengths much greater than those of the untreated article. In contrast to the limited applicability of past methods, the present method is applicable to glass articles formed by blowing, pressing, drawing, rolling and a wide variety of other known methods.

This invention is based in part on the empirical discovery and determination that a copper ion-enriched surface zone, produced by the displacement of copper ions of certain metal ions adjacent the surface of a glass article and having a thickness greater than the normal abrasive scratching or cutting to which the glass surface is ordinarily subjected in use, can by a certain treatment of the article be made to behave as if it has a coefficient of thermal expansion which is less than that of the interior portion of the glass article into which the copper ions have not penetrated. I have found that if the glass article is given a certain treatment, contemporaneously with or after the surface impregnation with copper, a compressive surface zone results which greatly increases the strength of the article, often by a factor of two, three or more. In addition, the copper ion-rich surface layer or zone makes the glass more resistant to chemical attack by leaching of alkali from the glass.

The mere provision of a copper ion-rich layer at the surface of the glass does not in and of itself accomplish my purpose nor provide the improved results. The glass with the copper ion-rich surface layer must be subjected to a thermal treatment which is believed to relieve strain within the glass at the treating temperature so that subsequent cooling to room temperature places the copper ion-enriched surface layer under compression. This compression results from the fact that the modified surface layer of the article apparently has a lower coefficient of expansion than the interior of the article, between the peak treating temperature and room temperature; hence the interior of the article can be envisioned as tending to shrink more on cooling than the copper ion-enriched surface layer, thereby placing the surface layer in compression.

Inasmuch as the radius of Cu+ monovalent copper ions, 0.96 angstrom units, is very nearly equal to the 0.95A radius of monovalent sodium ions Na+, it is difficult to account for the change in expansion of the modified surface layer on the basis of copper replacement of sodium. Where the substituted ions are about the same size as those replaced, it would not be predicted that a significant change in the glass structure would occur.

Ths invention is also based in part on the discovery that, by incorporating a reducing agent in the glass composition which is to be strengthened, the treated article will not only display improved strength, but it can also be colored, or converted to a different color. One coloration which can be obtained by this method is a dark ruby color which is especially useful in glass beer bottles, and which affords excellent protection against aging and storage degradation of bottled beer.

Broadly stated, the method according to this invention comprises, forming an article of a reduced glass composition which contains replaceable alkali metal ions, and heating the article in the presence of a cuprous halogen, i.e., cuprous chloride, bromide, or iodide, to cause copper ions to migrate from the surface into a zone underlying the surface in partial exchange for the alkali metal ions of the glass. The heating cycle should attain a peak temperature which is above the annealing point of the glass but not so high as to cause undesirable deformation of the article. The heating is carried out for a period sufficient that the copper ion-enriched layer is placed in compression when the article is subsequently cooled.

The term "annealing point," as defined by the American Society for Testing Materials, is that temperature at which the particular glass has a viscosity of $10^{13}$ poises. The annealing point can be determined by the method of ASTM C336-54T, as described in ASTM Standards on Glass and Glass Products, "Methods of Testing Specifications," 5th ed., December 1962.

The method of this invention is broadly applicable to the treatment of reduced glass compositions which include 7 to 25% of the alkali metal oxide $Na_2O$, and 45 to 80% by weight $SiO_2$. I prefer to use reduced glasses which include about 55 to 76% by weight $SiO_2$, 9 to 19% $Na_2O$, 0 to 13.5 total ($CaO+MgO$), and 1 to 22% $Al_2O_3$. Included in this are certain colored soda-lime container glasses of commerce, which are reduced glasses having approximately 65 to 74% $SiO_2$, 14 to 17% $Na_2O$, 7 to 12% ($MgO+CaO$), up to 3% $Al_2O_3$. I have found that especially large strength improvements can be obtained with soda-lime compositions.

By the terms "reduced glass" and "reduced glass composition," I mean a glass made from a batch which includes a reducing agent. The term "reducing agent," as used in the glass industry, is defined in "Standard Definitions of Terms Relating to Glass and Glass Products," ASTM C162-52, as "A chemical which, at high temperatures, lowers the state of oxidation of the batch chemicals." Well known reducing agents commonly used for making reducing glass compositions include FeS, $MoS_2$, ZnS, sea coal, cyanides, as well as urea, starch and other thermally decomposable organic materials. Reduced glass surface regions can also be made from ordinary oxidized glasses, by subjecting them to the reducing portion of a gas flame, as in firepolishing or glazing, or by heating the glass in a reducing atmosphere such as CO or cracked gas.

As described more fully hereinafter, the method of this invention may be carired out by contacting the reduced glass article with the cuprous halogen in the vapor state. Cuprous chloride (CuCl, sometimes alternately given as $Cu_2Cl_2$ or $Cu_3Cl_3$) is a solid at room temperature, vaporizes at useful rates above approximately 750° F. at atmospheric pressure, and melts at 792° F. The relative vapor pressures of cuprous chloride, cuprous bromide (CuBr) and iodide (CuI) are given in the following table:

|  | CuCl | CuBr | CuI |
|---|---|---|---|
| Temp. at which vapor pressure is 1 mm. Hg,°F | 1,015 | 1,062 | Solid |
| Temp. at which vapor pressure is 10 mm. Hg, °F | 1,296 | 1,324 | 1,213 |

When an alkali metal-containing reduced glass is heated to about 800° F. or higher in the presence of a vapor of one or a mixture of cuprous halogens, copper ions migrate from the vapor a short distance into the interior of the glass beneath the surface, displacing alkali metal ions therein. The displacement of sodium ions by this process can often be detected by the formation of a film of the corresponding sodium halogen on the surface of the article. The presence of copper in the glass surface has been confirmed by X-ray fluorescence analysis.

Figure 2:
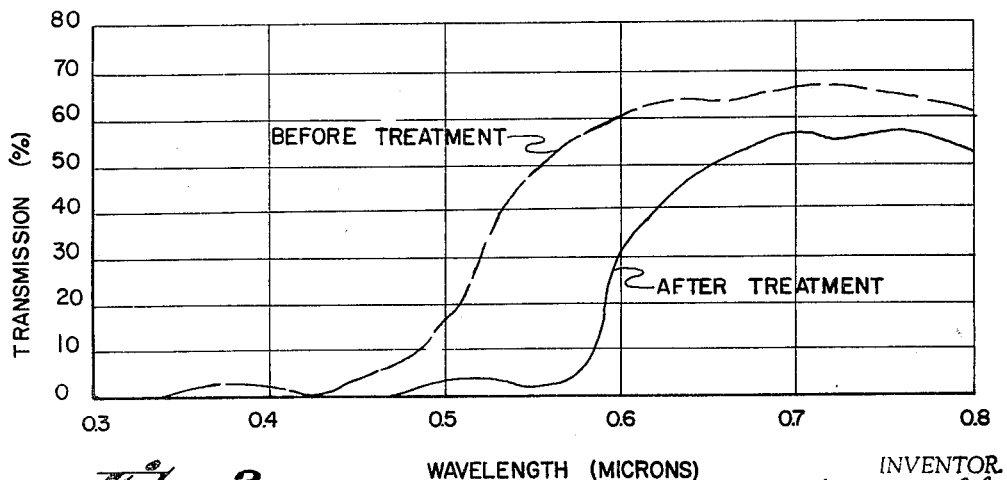

The practice of the invention can best be further described in relation to the following examples and the accompanying drawing, in which:

FIGURE 1 is a flow sheet illustrating a preferred method of practicing the invention by cuprous chloride treatment of articles of colored soda-line containers on a batch basis; and FIGURE 2 is a graph showing the spectral transmission curve of an amber beer bottle before and after treatment according to the method of this invention.

Various reducing glass compositions which have been used in carrying out the new method are set forth in Tables 1 and 2 following. Such compositions are usually made from batches containing about 0.02 to 1.0% of FeS, ZnS, $MoS_2$, $Fe_2O_3$, FeO, or an organic reducing agent. Table 1 shows the batch constituents in parts by weight, while Table 2 shows the composition of the resulting glass, as calculated from the batch. Compositions 1 and 2 are reducing glass compositions which are in large scale commercial use.

TABLE 1.—BATCH CONSTITUENTS IN PERCENT

| Raw material | Composition No. | | | | | | |
|---|---|---|---|---|---|---|---|
|  | 1 | 2 | 3 | 4 | 5 | 6 | 7 |
| Sand | 60.36 | 63.25 | 63.86 | 63.88 | 64.01 | 63.95 | 64.14 |
| Soda ash | 22.66 | 22.01 | 21.50 | 21.50 | 21.55 | 21.53 | 21.59 |
| Burnt dolomite lime | 3.35 | 9.87 | 8.17 | 8.17 | 8.19 | 8.18 | 8.20 |
| Slag | 11.20 | | | | | | |
| Nephelene syenite | | 3.38 | 4.52 | 4.52 | 4.53 | 4.53 | 4.54 |
| Flourspar | | 0.60 | 0.73 | 0.74 | 0.74 | 0.74 | 0.74 |
| Barytes | | 0.30 | 0.35 | 0.39 | 0.39 | 0.39 | 0.39 |
| Salt cake | | | 0.25 | | | | |
| Gypsum | 1.30 | | | | | | |
| Iron pyrite | 0.18 | | | 0.80 | | | 0.40 |
| ZnS | | | | 0.82 | | | |
| $MoS_2$ | | | 0.03 | | | 0.68 | |
| Black iron oxide | 0.05 | | | | 0.59 | | |
| Coal | | 0.13 | | | | | |

TABLE 2.—CALCULATED COMPOSITION

| Component | Composition No. | | | | | | |
|---|---|---|---|---|---|---|---|
| | 1 | 2 | 3 | 4 | 5 | 6 | 7 |
| $SiO_2$ | 71.66 | 72.40 | 73.33 | 73.36 | 73.57 | 73.39 | 73.73 |
| $Na_2O$ | 14.82 | 14.80 | 14.38 | 14.39 | 14.43 | 14.39 | 14.46 |
| $K_2O$ | | 0.19 | 0.25 | 0.25 | 0.25 | 0.25 | 0.25 |
| $Al_2O_3$ | 1.95 | 1.07 | 1.36 | 1.36 | 1.37 | 1.36 | 1.37 |
| CaO | 7.35 | 6.82 | 5.70 | 5.70 | 5.72 | 5.71 | 5.73 |
| MgO | 3.53 | 4.41 | 3.62 | 3.63 | 3.64 | 3.63 | 3.64 |
| BaO | 0.21 | 0.24 | 0.27 | 0.27 | 0.27 | 0.27 | 0.27 |
| ZnO | | | 0.76 | | | | |
| $MoO_3$ | | 0.031 | | | | 0.67 | |
| MnO | 0.01 | | | | | | |
| $Fe_2O_3$ | 0.243 | 0.024 | 0.023 | 0.75 | 0.75 | 0.024 | 0.39 |
| S | 0.217 | 0.014 | 0.30 | 0.30 | 0.30 | 0.30 | 0.15 |
| Annealing point, °F | 988.2 | 975.2 | ~973 | ~973 | ~973 | ~973 | ~973 |

EXAMPLE 1

Glass samples in the form of 12 oz. non-returnable amber beer bottles of composition 1 were treated in a Trent electrically heated furnace. The furnace chamber was approximately 24 inches square and 18 inches high, and the electrical heating elements were located on the two sides of the furnace. A circulating fan was provided in the back of the chamber. The bottles were placed on a shelf approximately seven inches above the floor of the furnace, and a refractory crucible containing granular CuCl was set on the bottom of the furnace, the top of surface of the CuCl in the crucible being about six inches below the shelf. The exposed surface of the CuCl in the crucible was a circle about 3.5 inches in diameter.

With both the bottles and crucible in place, the furnace was heated from room temperature to 900° F. in about 2 hours, then to about 1150° F. at a rate of approximately 2.8° F. per minute above 900° F. Temperature was held for ½ hour at approximately 1150° F. The crucible containing CuCl was removed and the furnace was then turned off and the door opened slowly to accelerate the cooling process. The furnace cooled at a rate of about 15° F./minute, and after it had cooled to a temperature of about 300° F. the bottles were removed.

During the treatment a portion of the CuCl volatilized from the crucible and was circulated in the chamber by the fan. Molecules of the vaporized CuCl came into contact with and were deposited on the outer surface of the bottles and, to a lesser extent, on the inside surface. A portion of the copper ions migrated from the bottle surfaces into the glass network, displacing sodium ions therein. A white powdery film was visible on the surfaces of the bottles. This film was readily removable by rinsing with water, and upon analysis was identified as common salt, sodium chloride.

Prior to treatment the bottles displayed an amber color, having the spectral transmission curve shown in FIGURE 2 of the drawings. After the treatment described, it was found that the bottles had a red color, sometimes called ruby, having a different spectral curve, also shown in FIGURE 2. From a comparison of these curves it will be apparent that the treatment greatly decreases the transmissivity of the glass to radiation of wave lengths in the 0.3–0.6 micron range. As will be seen, the glass is also strengthened.

It is known that radiation between 0.3 micron and 0.5 micron causes photochemical reactions in food, which for example lead to a spoilage of the taste and smell of beer, the destruction vitamin C and riboflaven in milk and the oxidation of olive oil (see Kriz, Kaderavek, and Pacovsky, paper No. 99, International Congress on Glass, Brussels, 1965). As shown in U.S. Patent No. 2,452,968, a ruby glass having a spectral curve such as that shown in FIGURE 2 is unusually effective in the preservation of beer from the effects of the sunlight. Hence, by this treatment of conventional amber bottles their color can be changed to the more highly protective ruby color. At the same time, the strength of the bottle is increased, so that thinner walled bottles can be made which will provide the same resistance to breakage as the thicker bottles now in use.

EXAMPLE 2

In separate tests designated as 2a–2e, amber bottles of composition 1 were placed in the furnace previously described, together with different numbers and arrangements of crucibles containing CuCl. In each test, the bottles and crucibles were heated to 1150° F. at the same rate as in Example 1 and held at that temperature for ½ hour. The crucible or crucibles were then removed and the furnace was cooled.

After removing the salt coating on the outside and, to a lesser extent, the inside of the bottles, the percentage of copper on the surface of the bottles was measured by X-ray fluoresence, using the method described by Shonebarger and Carr in The Glass Industry, v. 44, No. 10, October 1963, p. 557. The bottles were also tested, in unabraded condition, for resistance to internal bursting pressure by an internal pressure tester manufactured by American Glass Research, Inc. In this test the bottles were filled with liquid and connected to a source of hydraulic pressure by which the internal pressure could be increased in controlled increments. Testing started at a pressure and hold time equivalent to 100 p.s.i. for 1 minute, after which pressures equivalent to 112, 125, 137, 150, 162, 175, 187, 200, 225, 250, 275, 300, 325, 350, 375, 400, 425, 450, 475, 500, 525, and 550 p.s.i., and a hold time equivalent to one minute at each pressure, until the bottle burst. If a bottle did not break at the pressure equivalent to 550 p.s.i. for a one minute hold period (the maximum attainable with the test apparatus), the value of 550 p.s.i. was used to calculate the average strength. The test results show clearly that in every instance, strength was markedly improved by the treatment. Table 3 shows the percent surface copper, average bursting strength, the number of treated bottles per lot of 24 which did not break even after testing at a maximum internal pressure of 550 p.s.i., and the color of the treated bottle for each of the tests 2a–2e.

In measuring the copper content of the enriched surface zone by X-ray fluorescence, the intensity of the signal detected is compared with the intensity of the signal from a homogeneous glass of known copper ion content. The resultant value does not, therefore, represent the copper content at the surface of the treated glass, or the average copper content through the treated zone, but rather is an expression of the copper content of a uniformly enriched glass which produces an absorption of equivalent intensity.

Hence the copper contents expressed herein designate this equivalent value, rather than actual contents.

in the formation of the corresponding sodium halide. Where the halogen used is the chloride, a visible white

TABLE 3

| CuCl source | Surface Percent Cu., wt. | Average bursting strength, p.s.i. | No. of bottles passing 550 p.s.i. test, per lot of 24 | Color after treatment |
|---|---|---|---|---|
| Test No.: | | | | |
| None (control) | | 205.7 | 0 | |
| 2a........... Large crucible (3¼″ diameter) | 1.87 | 415.6 | 2 | Ruby. |
| 2b........... 2 covered crucibles (1½″ diameter) | 0.10 | 303.1 | 0 | Amber. |
| 2c........... 2 uncovered crucibles (1¼‴ diameter) | 0.68 | 400.6 | 2 | Lt. ruby. |
| 2d........... 2 uncovered crucibles near heating elements (1½″ diameter) | 1.13 | 404.3 | 5 | Ruby. |
| 2e........... 4 uncovered crucibles (1¼‴ diameter) | 1.97 | 468.5 | 10 | Do. |

It will be noted that in each instance, with even as little at 0.10% measure copper in the surface layer, the average pressure in p.s.i. at which a bottle would burst was increased by at least 47%, and that strength generally increased with increasing copper content. Although it is difficult to verbalize the comparative colors of the bottles after treatment at the various conditions, color appears to increase roughly in density, or to become increasingly ruby or red-brown, with the percent of copper.

The bottles which contained 0.10% copper were very slightly, if any, darker than the untreated bottles. I have found from other tests that the color change usually becomes easily apparent when the surface concentration of copper exceeds about 0.6%. At 2% copper, a deep ruby color is seen when looking through a single layer of the surface color. However, it should be understood that the invention contemplates strengthening reducing glass articles without imparting significant color to them, by relatively low copper enrichments, as well as strengthening with the impartation of color, by adding larger quantities of copper.

Without intending to limit the invention to a particular theory of operation, it is presently believed that the coloration is caused by the presence of $Cu^+$ ions. The double-charged $Cu^{++}$, or cupric, state of oxidation is normally the more stable condition for ionic copper, but the reducing nature of the glass tends to hold the migrated copper, or at least a large proportion of it, in the $Cu^+$ state. It does not appear that the reducing agent actually reduces the copper ions to metallic copper; rather it prevents, or at least restricts, the normal tendency of the cuprous ions to shift to the cupric state in the glass.

In articles produced according to the method of this invention, the copper-ion enriched surface layer is placed in compression by the thermal treatment. This can be ascertained by viewing a thin, fractured sample edgewies in polarized light between crossed nicols in a microscope, according to known technique. However, with increasingly darker glass colors, measuring of strains becomes inaccurate, then impossible.

The furnace atmosphere in which the copper halogen is transmitted or applied to the article need not be an inert atmosphere, or a reducing atmosphere; indeed, one of the advantages of this method is that an ordinary air atmosphere (into which the cuprous halogen is introduced) can be used. In other words, the presence of normal amounts of oxygen in the atmosphere does not render the process inoperative; in fact, the process is ordinarily practiced in air, simply because it is easier to do so than to control the atmosphere. It should also be understood, however, that in place of air, it is possible to use nitrogen or similar gas atmospheres. The presence of water vapor in the treating atmosphere tends to promote oxidation of the copper, and in sufficient quantity may reduce coloration, though it does not prevent a strength improvement.

As previously suggested, the copper-sodium ion exchange effected by the cuprous halogen exposure, results in the formation of the corresponding sodium halide. Where the halogen used is the chloride, a visible white film can often be seen on the article surface at treating temperatures below about 1150° F., which can be taken as one simple indication that the exposure has been sufficient to cause useful copper enrichment by ion exchange. I have found that treating temperatures above about 1100° F. are advantageous because they tend at least partially to remove the salt film by vaporization. Alternatively, this deposit can be removed by rinsing, or can be dissolved in a lubricity spray and left on the glass surface.

As the sample is exposed to CuCl vapors of increasing concentration, or is exposed for a longer time, different conditions will usually occur. At exposures above the level at which a white salt film is visible, the coating becomes darker but is easily removed by rinsing, and generally has no adverse affect. At still more concentrated exposures the vapor leaves a dark coating on the article; in this case the deposit may require some mechanical force or mild abrasion, as well as rinsing, to be removed from the glass surface, although the deposit is not otherwise harmful. Still greater exposure to CuCl leaves a deposit which cannot be washed or rubbed from the article and which may be undesirable commercially depending upon intended use, although nonetheless an improvement in strength over the untreated surface is obtained. If the treatment is so concentrated that small dark specks of CuCl become fused to the glass surface, these cause a local decrease in the strength at the point of fusion, and such severe exposure is therefore ordinarily to be avoided. It is believed that these specks are sometimes caused by sputtering of the solid cuprous compound, and hence they can often be avoided by placing a porous baffle over the top of the crucible which will prevent escape of droplets for it. Another cause of specking is condensation from adjacent relatively cool surfaces in the furnace.

EXAMPLE 3

Water tumblers of composition 2 were treated at the cylcle described in Example 1. The resulting glasses were converted to a cranberry color, and were of increased strength relative to the untreated tumblers.

EXAMPLE 4

Batches of compositions 3, 4, 5, 6 and 7 were separately melted and patties were cast and rods were drawn from each glass. Each of these compositions is a reducing glass, made from a batch containing respectively, zinc sulfide, ferrous sulfide, black iron oxide, molybdenum disulfide and ferrous sulfide as the reducing agent (see Table 1). All batches were melted in a gas fired furnace with no muffle.

Sections of rods of each composition were treated by heating in a furnace containing a source of CuCl at a rate of about 6.7° F. per minute to a temperature of about 1155° F. and held at that temperature for one-half hour, then cooled to room temperature at a rate of about 6.7° F. per minute. The CuCl source was in the furnace throughout.

The abraded strength of the untreated rods was about 16,000 p.s.i. After treatment, the average strengths of the rods were as follows:

Composition: p.s.i.
    3 _____ 32,000
    4 _____ 40,300
    5 _____ 35,900
    6 _____ 36,700
    7 _____ 32,700

It is apparent that the strength is improved by a factor of two to three times.

Sections of the patties were ground and polished, heated to 1170° F. in the absence of any cuprous halogen vapor, then introduced into an atmosphere containing CuCl vapor at 1170° F., and held for ½ hour. The source of vapor was removed, vents to the furnace opened and the sample was annealed by cooling at about 15° per minute. The ground and polished patty sections were used to determine the percent copper in the glass surfaces by X-ray fluorescence. The amount of copper detected in composition 3 was 1.99%; that in composition 4 was 2.10%; in composition 5, 1.94%; in composition 6, 1.97%; and in composition 7, 2.19%.

As a result of the copper treatment each glass patty had changed color, composition 3 changing from an initial yellow color to a ruby, composition 4 changing from initial black to a reddish-black, composition 5 changing from an initial blue-green to a darker blue-green, composition 6 from yellow to a ruby color, and composition 7 changing from a dark amber to a dark ruby color.

Because of the color of the glass, it is difficult to make an accurate measure of the full depth in the glass body to which the copper ions migrate from the treated surface. In a section of the ruby glass 0.1″ thick in the viewing direction (that is, perpendicular to a fractured edge) there appears to be a very thin surface blue layer which is believed to be caused by surface oxidation, then the dominating ruby layer, then the underlying or initial color of the glass, which remains unchanged. As the sample thickness increases in the viewing direction, the depth of Cu penetration appears to increase; moreover, the presence of an inherent color in the glass itself tends to darken the sample. Because a minimum concentration of $Cu^+$ ions is required to observe their presence at all, the maximum penetration is generally not observed. Copper enrichments from about 0.1% up to about 7% are especially advantageous, depending on color desired, aesthetic requirements, end use, and other factors, because they seem to impart the greatest strength improvements. Some evidence suggests that at the actual glass surface the sodium ions may be almost completely replaced by copper ions. The concentration of the copper decreases sharply with distance from the surface. Depending on copper content and other factors, the article may be transparent, translucent or even opaque (see Ex. 8).

EXAMPLE 5

Each of the batch compositions 1 and 3–7 of Table 1 contains an inorganic reducing agent only. Reduced glasses can alternatively be made by incorporating an organic reducing agent in the batch as shown by Example 2. Compositions 8, 9, and 10, shown in Table 4, are further illustrative of this, being made from batches which include starch. Since the starch burns out on melting, it does not show up in an ordinary analysis of the glass, nor does it impart a strong color to the untreated glass; for example, compositions 8 and 9 were light yellow, as made: Nonetheless, such reducing glasses can react upon copper halogen treatment to yield a strong ruby color.

TABLE 4.—BATCH CONSTITUENTS IN PERCENT

| Raw material | Composition No. 8 | 9 | 10 |
|---|---|---|---|
| Sand | 63.75 | 63.95 | |
| Nephelene syenite | 4.52 | 4.53 | 84.82 |
| Soda ash | 21.47 | 21.53 | 14.84 |
| Burnt dolomite lime | 8.16 | 8.18 | |
| Fluorspar | 0.74 | 0.74 | |
| Barytes | 0.39 | 0.39 | |
| ZnO | 0.70 | | |
| $MoO_3$ | | 0.41 | |
| Starch | 0.27 | 0.27 | 0.34 |
| CALCULATED COMPOSITION | | | |
| $SiO_2$ | 73.54 | 73.78 | 55.22 |
| $Na_2O$ | 14.42 | 14.47 | 18.28 |
| $K_2O$ | 0.25 | 0.25 | 4.11 |
| $Al_2O_3$ | 1.37 | 1.37 | 21.58 |
| CaO | 5.72 | 5.74 | .64 |
| MgO | 3.64 | 3.65 | .09 |
| BaO | 0.27 | 0.27 | |
| ZnO | 0.76 | | |
| $MoO_3$ | | 0.45 | |
| $Fe_2O_3$ | 0.023 | 0.023 | .07 |
| Annealing point, °F | ~973 | ~973 | ~1,080 |

Compositions 8 and 9 were melted as described in Example 4 and the patties were treated by heating to 1170° F. then introducing them into an atmospheric containing CuCl vapor at 1170° F. for ½ hour, followed by annealing in the absence of the vapor. Percent copper in the glass surface, as determined by X-ray fluorescence, was found to be 2.00% in the treated sample of composition 8 and 1.98% in the glass of composition 9. The colors of the treated objects were light ruby and light amber respectively. The abraded strengths of rods of compositions 8 and 9 were increased from an average value before treatment of 16,000 p.s.i. to 43,000 and 37,800 p.s.i. respectively after treatment.

It appears that the inclusion of ZnS, FeS, or $MoS_2$ in the glass batch will assist the $Cu^+$ complexes in producing a deep ruby color.

EXAMPLE 6

The relation of the degree of copper enrichment to severity of treating cycle is shown by the following:

Amber bottles of composition 1 were placed in the furnace with a copper chloride containing crucible at room temperature and the furnace was heated at a relatively slow rate of 2.8° F. per minute above 900° F., to a peak of 1120° F. Bottles withdrawn at certain intervals after the furnace reached the peak temperature displayed different copper contents:

| Test No. | Minutes after reaching peak temperature | Percent surface copper |
|---|---|---|
| 6a | 0 | 0.23 |
| 6b | 10 | 0.43 |
| 6c | 20 | 0.58 |
| 6d | 40 | 1.03 |

The 0.23% copper in Test No. 6a was picked up during heating to peak temperature. During the holding period at peak temperature copper enrichment proceeds at an approximately linear rate.

EXAMPLE 7

Tests similar to those described in Example 6 were made with a holding temperature of 1170° F. with removal of samples beginning at 770° F.

| Test No.: | Time at peak, minutes | Temperature, °F. | Percent copper | Color |
|---|---|---|---|---|
| 7a | | 770 | 0.00 | Amber. |
| 7b | | 870 | 0.01 | Do. |
| 7c | | 970 | 0.01 | Do. |
| 7d | | 1,020 | 0.02 | Do. |
| 7e | | 1,070 | 0.11 | Do. |
| 7f | | 1,120 | 0.32 | Do. |
| 7g | 0 | 1,170 | 0.73 | Light ruby. |
| 7h | 10 | 1,170 | 1.27 | Ruby. |
| 7i | 20 | 1,170 | 1.35 | Do. |
| 7j | 30 | 1,170 | 1.77 | Dark ruby. |

EXAMPLE 8

In separate tests designated as 8a–8d, rods of composition 10 were treated at different cyles. Heat-up was at a rate of 6.7° F. in each case, with different peak temperatures and hold periods as follows:

Test No. 8a—Held for ¼ hour at 1140° F., then cooled. The average abraded strength of the rods so treated was 67,200 p.s.i., as compared to the average 22,200 p.s.i. strength of similar untreated rods. Color was changed from the original light green (as viewed axially) to green.

8b—Held for ½ hour at 1140° F., then cooled. The strength of the treated rods was 71,800 p.s.i., and color was changed to green by the treatment.

8c—Heated to 1215° F., then cooled. The strength of the treated rods was 68,000 p.s.i., and the color was an opaque yellow-green.

8d—Heated to 1275° F., held 22 minutes, then cooled. The strength of the treated rods was 70,800 p.s.i., and the color was an opaque yellow-green.

EXAMPLE 9

The foregoing examples demonstrate the treatment of various reducing glasses with cuprous chloride. As previously pointed out, other cuprous halogens can alternatively be used, or mixtures of two or more copper halogens can be used. In separate tests, rods of each of compositions 3 through 9 were treated at the same cycle as that used for the rods of Example 4, but with crucibles containing cuprous bromide and cuprous iodide respectively in place of a cuprous chloride source. In each instance the cuprous bromide and cuprous iodide treatments caused color changes in the rods which were about the same as the changes brought about by CuCl as described in Example 5. After the CuI treatment, the abraded strengths of compositions 4 and 9 were 36,500 and 34,400 p.s.i. respectively; after the CuBr treatment the strengths of compositions 6 and 9 were 31,800 p.s.i. and 32,500 p.s.i. respectively. Insufficient numbers of rods of the other compositions were available to make accurate strength measurements on them. On the basis of presently available evidence, CuCl appears to impart the greatest strength improvements, followed by CuI then CuBr. Analogy suggests the feasibility of treatment with CuF, but it is not readily available at present and it is not stable in the ordinary atmosphere.

EXAMPLE 10

Tumblers of a conventional soda-lime oxidized glass composition were locally converted to reduced glass on the surface, as an incident to fire polishing of the cut edge of the tumbler. The fire polishing was carried out by playing the reducing portion of a gas flame on the tumblers immediately after forming. When the tumblers were subsequently exposed to copper chloride, as described in the foregoing examples, a light red or cranberry colored compression layer was developed in the fire polished surfaces.

From the foregoing it will be apparent to those skilled in the art that there are at least three variations in the manner in which the glass article can be treated in accordance with the invention: (1) The article can be exposed to the halogen at temperatures below the annealing point of the article, and the source of the vapor can then be removed. The article is then heat treated above the annealing point to relieve strain so that a compression layer is set up upon cooling. (2) The article can be heated to peak temperature while continuously in the presence of the copper halogen, so that the strain arising during heat up is relieved. (3) The article may be heated to a temperature above the annealing point in the absence of the vapor and subjected to the vapor only at temperatures above the annealing point. In this instance it is difficult to determine whether strain ever occurs at the treating temperature, but in any event after heat treatment compression stress is developed in the article.

Thus, it is not necessary that the initial exposure to the cuprous halogen be at a temperature which is above the annealing point of the glass, provided that the glass is thereafter treated above its annealing point to relieve the stress so that the copper enriched layer is placed in compression upon cooling. If the exposure is to a halogen in the gaseous state, the temperature used must be sufficiently high to vaporize the halogen and effect migration at a useful rate, preferably at least about 750° F. Halogen vapor pressures of about 0.5–2 mm. Hg are especially successful in effecting good strength improvement.

The maximum temperature at which any particular glass article can be effectively treated depends upon the shape of the article. In general, the article should not be treated at a temperature at which it deforms or sags to an undesirable extent. Thus, at a given treating temperature relatively complex shapes such as bottles may distort to an undesirable extent while flat plates of the same glass composition do not deform or may sag to a desirable shape. In other words, treatment at higher temperatures can be used in circumstances where undesired deformation is not a critical operating restriction, as in the drawing of sheet glass. Ordinarily, treatment at temperatures corresponding to glass viscosities in the range of $10^{10.6}$ to $10^{12.6}$ poises is good and treatment at viscosities of about $10^{11.0}$ to $10^{11.7}$ poises effects surprisingly high strength improvements. In terms of temperature, treatment at temperatures 50–200° F. above the annealing point of the glass is especially effective.

The optimum period of exposure of any given article to the cuprous halogen can most easily be determined by a series of runs with holds above the annealing temperature of increasing duration, with comparison of the strengths and colors of the treated articles. Treating times of 10 minutes to 5 hours at temperatures above the annealing temperature are the more useful, but the optimum will depend on the specific glass composition, the treating temperature, the state and concentration of the cuprous halogen, and other factors. Staining diluents or other compounds may be mixed with the halogen provided they do not undesirably react with it or prevent the diffusion of cuprous ions into the glass.

Those skilled in the art will recognize that colored designs can be produced on articles by masking or otherwise selectively limiting the surface area which is exposed to the halogen.

Having described my invention, I claim:

1. A method of altering the spectral transmission of amber colored soda-lime glass articles by changing the surface coloration thereof, while simultaneously strengthening the articles, said articles being made of a reduced glass composition including about 45 to 80% by weight $SiO_2$ and 7 to 25% $Na_2O$, said method consisting essentially of the steps:

heating the article and while heating exposing it to vapor of a member of the class consisting of CuCl, CuBr, and CuI, said vapor being the sole essential material present which is reactive with said article, said heating reaching a peak temperature which is above the annealing point of said glass composition but below the temperature at which the article sags out of desired shape, said heating and exposing being continued for a period sufficient to form a copper ion-enriched surface zone in the article, said heating being carried out in the absence of contact between said article and said member of said class in non-vaporous form, terminating said exposing before said article is cooled below the annealing point of said composition, and cooling said article below the annealing point in the absence of a reducing atmosphere.

2. The method of claim 1 wherein the glass composition on which said method is practiced is made from a batch containing an inorganic sulfide.

3. The method of claim 1 wherein the glass composition on which said method is practiced is made from a batch containing an organic glass reducing agent.

4. The method of claim 1 wherein the glass composition on which said method is practiced is made from a batch containing about 0.02 to 1.0% by weight of a member of the group consisting of FeS, $MoS_2$, ZnS, $Fe_2O_3$, and FeO.

5. The method of claim 1 wherein said member of said class is CuCl.

6. The method of claim 1 wherein said exposing begins at temperatures below the annealing point of said glass composition.

7. The method of claim 1 wherein said exposing includes exposing at peak temperatures which are 50–200° F. above the annealing point of said composition.

8. The method of claim 1 wherein the heating and exposing are of duration sufficient to establish a copper ion-enriched surface zone which contains about 0.1 to 7% Cu as measured by X-ray fluorescence.

9. The method of claim 1 wherein said member of said class is CuCl and said exposing is terminated while a coating of NaCl is visible on the surface of said article.

10. The method of claim 1 wherein the article on which said method is practiced is an amber colored beer bottle and said heating and exposing are of duration sufficient to change the color of said article to a ruby color having a spectral transmission curve substantially as shown in FIGURE 2.

11. The method of claim 1 wherein the glass composition upon which said method is practiced includes approximately 65–74% $SiO_2$, 14–17% $Na_2O$, 7–12% (CaO +MgO), 0–3% $Al_2O_3$, and about 0.02 to 1.0% of a member of the group consisting of FeS, ZnS, $MoS_2$, $Fe_2O_3$ and FeO.

12. The product of the method of claim 1.

References Cited

UNITED STATES PATENTS

| 207,077 | 8/1878 | Shirley | 65—30 XR |
|---|---|---|---|
| 3,345,190 | 10/1967 | Albinak et al. | 65—30 XR |
| 2,075,446 | 3/1937 | Leibig | 65—31 XR |
| 3,012,902 | 12/1961 | Bayer | 65—30 XR |

S. LEON BASHORE, Primary Examiner

SAUL R. FRIEDMAN, Assistant Examiner

U.S. Cl. X.R.

65—32, 60, 114; 106—52; 117—124.

UNITED STATES PATENT OFFICE
CERTIFICATE OF CORRECTION

Patent No. 3,502,454　　　　　　　　Dated March 24, 1970

Inventor(s)　　　F. J. Shonebarger

It is certified that error appears in the above-identified patent and that said Letters Patent are hereby corrected as shown below:

Column 3, line 10, change "Ths" to --This--

Column 4, line 43, change "line" to --lime--

Column 7, line 46, after "state" insert --.-- (period)

Column 7, line 54, change "wies" to --wise--

Column 8, line 51, change "for" to --from--

Column 8, line 56, change "cylcle" to --cycle--

Column 9, line 36, change "whlch" to --which--

Column 10, line 22, change "atmospheric" to --atmosphere--

Column 11, line 2, change "cyles" to --cycles--

(SEAL)
Attest:

SIGNED AND SEALED
AUG 25 1970

Edward M. Fletcher, Jr.
Attesting Officer

WILLIAM E. SCHUYLER, JR.
Commissioner of Patents